UNITED STATES PATENT OFFICE.

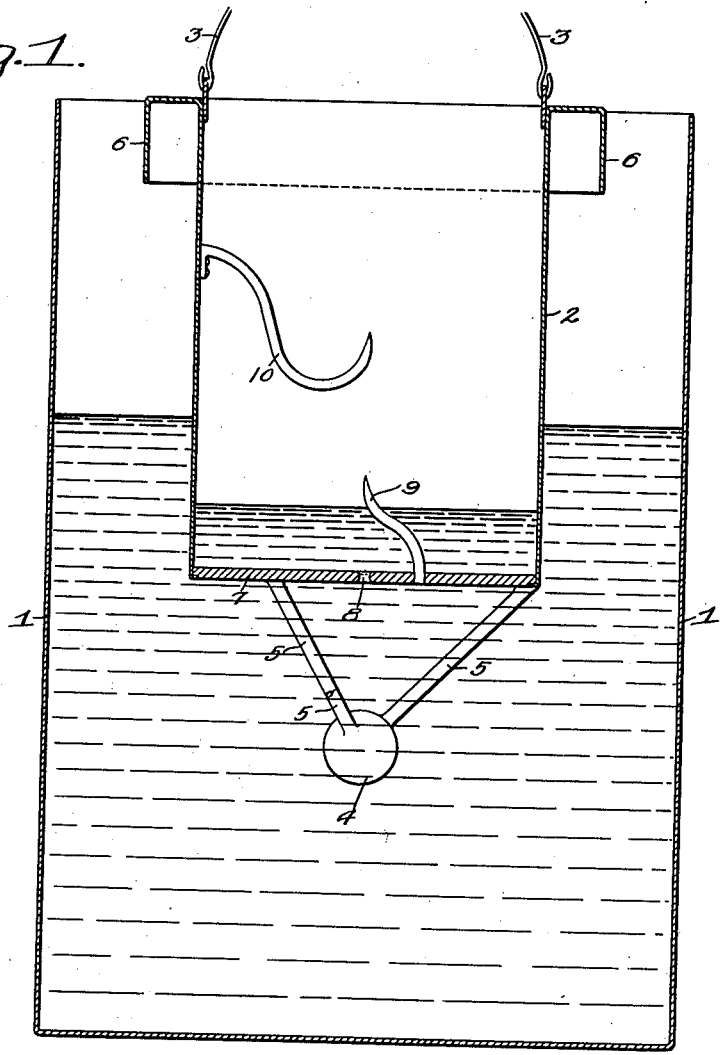
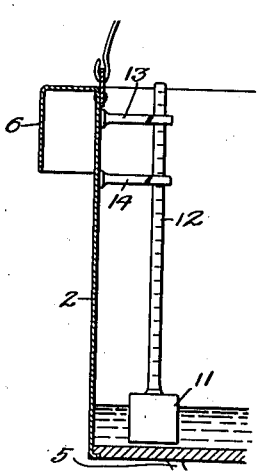

ARTHUR S. DYSART, OF PORTSMOUTH, NEW HAMPSHIRE, ASSIGNOR TO TINIUS OLSEN TESTING MACHINE COMPANY, OF PHILADELPHIA, PENNSYLVANIA, A CORPORATION OF PENNSYLVANIA.

VISCOSIMETER.

1,292,276.  Specification of Letters Patent.  Patented Jan. 21, 1919.

Application filed July 19, 1916. Serial No. 110,111.

*To all whom it may concern:*

Be it known that I, ARTHUR S. DYSART, a citizen of the United States, residing in Portsmouth, Rockingham county, State of New Hampshire, have invented Viscosimeters, of which the following is a specification.

One object of my invention is to provide a simple, accurate and inexpensive apparatus for quickly and conveniently determining the viscosity of a liquid, especially when this is in a relatively large mass:—the invention contemplating a device designed to float in the liquid whose viscosity is to be determined.

Another object of the invention is to provide a form of floating instrument for determining the viscosity of a liquid flowing under a constant head, the parts being so arranged that the instrument will not ordinarily sink in the liquid.

I further desire to provide a viscosimeter in the form of a container designed to float in the liquid whose viscosity is to be measured, together with means for measuring or indicating the rate of flow of liquid into said container through an orifice of standard dimensions.

These objects and other advantageous ends I secure as hereinafter set forth, reference being had to the accompanying drawings, in which, Figure 1 is a vertical section of a viscosimeter constructed according to my invention; and Fig. 2 is a slightly modified form of the instrument shown in Fig. 1.

In the above drawings, 1 represents a vessel holding the liquid whose viscosity is to be tested and 2 is a cylindrical or other suitably formed container shown as having the shape of a small bucket provided with a bail 3 and maintained in an upright position in the liquid by means of a weight 4 suspended centrally under its bottom by a plurality of arms 5.

The upper edge of this container 2 is preferably though not necessarily outwardly and downwardly flanged as indicated at 6, to provide a chamber whereby a body of air is trapped after it has sunk sufficiently to bring the edge of said flange below the surface of the liquid, with a view to preventing the further sinking of said container.

Through the bottom 7, preferably at its center, I provide an orifice 8 whose inner and outer edges are preferably outwardly flared as shown. Within the container I mount level indicating means shown as two hook gages 9 and 10, and while these may be supported from any desired points of said container, I have shown the first of them as projecting upwardly from the bottom and the second as connected to the inner wall of said vessel adjacent the top thereof. The latter gage consists of a sharp pointed wire or rod which, after extending downwardly, has its point turned up so as to terminate in the vertical center line of the container 2, in which is also included the point of the gage 9 and the center line of the orifice 8.

Under conditions of use the container 2 is placed in a body of the liquid whose viscosity it is desired to test, and it obviously at once sinks to a level depending on its total weight and displacement, bringing the orifice 8 to a definite distance below the surface of the liquid which begins to flow into the container through said orifice. This flow takes place under a constant head dependent on the weight of the container 2 and that of the ball 4 with their associated parts, for as the liquid rises in said container, the latter sinks, so that the distance between the level of the main body of liquid in the vessel 1 and that of the liquid in the container 2 remains constant. As the liquid flows into said container 2 through the orifice, the time required for it to rise from a level coincident with the extremity of the point of the hook gage 9 to the level of the extremity of the point of the gage 10 is proportional to the viscosity of said liquid divided by the square root of its density; the correction being necessary because the pressure head acting to cause flow of liquid into the container 2 is greater for light liquids than for those which are heavier.

Under conditions of use the instrument is tested to accurately determine the time taken for the level of a standard liquid, such as water, to rise from the level of one gage to that of the other;—the viscosity of any other liquid as compared with that of said standard liquid being therefore proportional to its rate of flow into the container through the orifice and hence to the time which it takes to rise in said container from the point of one hook gage to that of the other, as compared to the time taken for an equal volume of the standard liquid to enter the container.

After the container 2 has sunk to such a depth that the top of the flange 6 passes into the liquid in the vessel 1, the body of air trapped effectually prevents further sinking of the instrument.

If desired, means other than the hook gages may be employed to determine or indicate the rate of flow of liquid into the container 2 through the orifice 8 under a constant head. For example, if desired, I may provide a float 11 having fixed to it a vertically extending, graduated stem 12 passing through a pair of guides 13 and 14 adjacent the upper part of the inner wall of the container 2. A comparison of the times required for equal amounts of different liquids to flow into said container through the orifice 8 and raise the float through a given distance will then provide a measure of the viscosity of said liquids, proper correction being made as above indicated, to compensate for differences of pressure head resulting from differences in the densities of the liquids.

I claim:—

1. A viscosimeter consisting of a container having an inlet orifice; and means for maintaining a constant head on said orifice when the container is floated in a body of liquid independently of other structures.

2. A viscosimeter consisting of a bucket having an orifice in its bottom; and a weight maintaining said bucket in an upright position when it is independently floated in a body of liquid.

3. A viscosimeter consisting of a bucket having an orifice in its bottom; a weight maintaining said bucket in an upright position when it is floated in a body of liquid; and means for indicating the changes in depth to which said bucket sinks in the liquid as the latter flows into it through said orifice.

4. A viscosimeter consisting of a container having an inlet orifice; means for maintaining a constant head on said orifice when the container is floated in a body of liquid; and means within the container for indicating liquid levels.

5. A viscosimeter consisting of a container having an inlet orifice; means for maintaining a constant head on said orifice when the container is floated in a body of liquid; and means for measuring the influx of liquid into the container through said orifice.

6. A viscosimeter consisting of a container having an inlet orifice in its lower portion; means for maintaining a constant head on said orifice when the container is floated in a body of liquid; and two hook gages mounted with their points at different levels for indicating when a predetermined amount of liquid has entered the container through the orifice.

7. A viscosimeter consisting of a container having an inlet orifice; means for maintaining a constant head on said orifice when the container is floated in a body of liquid; and means for preventing sinking of the container beyond a predetermined depth.

8. A viscosimeter consisting of a container having an inlet orifice; means for maintaining a constant head on said orifice when the container is floated in a body of liquid; and means for preventing sinking of the container beyond a predetermined depth, consisting of an air chamber adjacent its upper edge.

9. A viscosimeter consisting of a container having an inlet orifice; means for maintaining a constant head on said orifice when the container is floated in a body of liquid; and an annular flange surrounding the top of the container and bent down to form an air chamber for preventing said container sinking beyond a predetermined depth in the liquid.

10. A viscosimeter consisting of a bucket having an orifice in its bottom; a weight suspended centrally under said bottom; and means in the bucket for determining liquid levels.

ARTHUR S. DYSART.